(12) United States Patent
Wehinger et al.

(10) Patent No.: US 7,444,889 B2
(45) Date of Patent: Nov. 4, 2008

(54) LOAD CELL

(75) Inventors: Rolf-Dieter Wehinger, Balingen (DE); Frank Metzger, Albstadt (DE); Joerg Baltinger, Balingen (DE); Thomas Plocher, Sulz (DE)

(73) Assignee: BAG Bizerba Automotive GmbH, Balingen (DE)

( * ) Notice: Subject to any disclaimer, the term of this patent is extended or adjusted under 35 U.S.C. 154(b) by 0 days.

(21) Appl. No.: 11/844,418

(22) Filed: Aug. 24, 2007

(65) Prior Publication Data

US 2008/0022784 A1    Jan. 31, 2008

Related U.S. Application Data

(63) Continuation of application No. PCT/EP2006/001972, filed on Mar. 3, 2006.

(30) Foreign Application Priority Data

Mar. 3, 2005  (DE)  ........................ 10 2005 010 982

(51) Int. Cl.
*G01L 1/26* (2006.01)
*G01L 1/12* (2006.01)
*G01G 21/28* (2006.01)
*B60K 28/04* (2006.01)
*G01G 19/52* (2006.01)

(52) U.S. Cl. ............... 73/862.637; 180/273; 297/217.2; 177/243; 177/144; 73/862.69; 73/862.624; 73/862.382

(58) Field of Classification Search ........... 177/144, 177/210 EM; 180/272, 273; 297/217.2, 297/217.3; 73/862.69, 862.621, 862.624, 73/862.382, 862.637, 862.636

See application file for complete search history.

(56) References Cited

U.S. PATENT DOCUMENTS 4,827,240 A    5/1989    Häfner (Continued)

FOREIGN PATENT DOCUMENTS

DE    36 27 127    2/1988

(Continued)

OTHER PUBLICATIONS

International Preliminary Report on Patentability, Form PCT/IB/373, Nov. 19, 2007.

*Primary Examiner*—Edward Lefkowitz
*Assistant Examiner*—Punam Patel
(74) *Attorney, Agent, or Firm*—Leydig, Voit & Mayer, Ltd.

(57) ABSTRACT

To provide a load cell, having a force transducer for recording tensile and compressive forces that are to be determined, which can be produced more economically and, in particular, can also be handled more easily during the adjustment of the sensor arrangement than hitherto, the force transducer comprising a flectionally elastic element and a force introduction part acting on the flectionally elastic element, having a sensor arrangement for detecting a deformation of the flectionally elastic element and the transformation thereof into an electric weighing signal, and having a housing receiving the force transducer and the sensor arrangement, with a flectionally rigid wall part, on which the flectionally elastic element of the force transducer is held, it is proposed that the sensor arrangement be arranged on a separate carrier, which is held on the flectionally rigid wall part and/or a flectionally rigid base part region of the housing

52 Claims, 2 Drawing Sheets

U.S. PATENT DOCUMENTS

| | | | |
|---|---|---|---|
| 5,339,699 A * | 8/1994 | Carignan | 73/862.69 |
| 5,565,632 A * | 10/1996 | Ogawa | 73/862.69 |
| 6,129,168 A | 10/2000 | Lotito et al. | |
| 6,457,545 B1 * | 10/2002 | Michaud et al. | 180/272 |
| 2005/0284669 A1 * | 12/2005 | DiPaola et al. | 177/136 |
| 2006/0090566 A1 * | 5/2006 | Oda | 73/715 |
| 2006/0112769 A1 | 6/2006 | Selig et al. | |
| 2006/0129047 A1 * | 6/2006 | Ruotoistenmaki | 600/483 |
| 2007/0028703 A1 * | 2/2007 | Christoph et al. | 73/862.621 |
| 2007/0151648 A1 * | 7/2007 | Loewe | 152/419 |

FOREIGN PATENT DOCUMENTS

| | | |
|---|---|---|
| DE | 41 32 108 | 4/1993 |
| DE | 199 18 200 | 10/1999 |
| DE | 103 25 390 | 12/2004 |
| EP | 0 199 067 | 10/1986 |
| JP | 2001133335 A * | 5/2001 |

* cited by examiner

LOAD CELL

This application is a continuation of international application number PCT/EP2006/001972 filed on Mar. 3, 2006.

The present disclosure relates to the subject matter disclosed in international application number PCT/EP2006/001972 of Mar. 3, 2006 and German application number 10 2005 010 982.9 of Mar. 3, 2005, which are incorporated herein by reference in their entirety and for all purposes.

BACKGROUND OF THE INVENTION

The invention relates to a load cell comprising a force transducer for recording tensile and compressive forces to be determined, wherein the force transducer has a flectionally elastic element and a force introduction part acting on the flectionally elastic element, comprising a sensor arrangement for detecting a deformation of the flectionally elastic element and the transformation thereof into an electric weighing signal and comprising a housing receiving the force transducer and the sensor arrangement with a flectionally rigid wall part, on which the flectionally elastic element of the force transducer is held.

A load cell, in which the flexible element is configured as a membrane, is known, for example, from DE 36 27 127 A1. This load cell is configured in the form of a load cell, in which a rigid carrier element holds the membrane in an elastically deformable manner, the deformation of the membrane being detected, for example, by means of a sensor arrangement, which contains a Hall generator.

A load cell is also known from DE 41 32 108 A1, in which a membrane also forms the flexible element. A capacitive sensor arrangement is used as the sensor arrangement.

The aforementioned load cells have in common that they are only of limited use in a harsh environment.

An improvement is provided here by the load cell according to DE 103 25 390 A1, which is, on the one hand, robust and, on the other hand, can also be installed in cramped conditions.

The relatively expensive construction, in particular for the assembly of the flexible element (also configured here as a membrane), and the adjustment of the elements of the sensor arrangement with respect to one another are disadvantageous in this solution.

SUMMARY OF THE INVENTION

In accordance with the present invention, a load cell of the type described at the outset is proposed, which is produced more economically and, in particular, can also be handled more easily during the adjustment of the sensor arrangement.

In accordance with an embodiment of the invention, a sensor arrangement is arranged on a separate carrier, which is held on the flectionally rigid wall part and/or a flectionally rigid base part region of the housing.

The carrier, on which the sensor arrangement is arranged, is preferably held directly on the flectionally rigid wall part and/or a flectionally rigid base part region of the housing.

It is particularly preferred that the carrier be held and supported exclusively on the flectionally rigid wall part of the housing, i.e. housing parts, which do not form part of the flectionally rigid wall part of the housing, maintain a spacing from the carrier so that even at maximally permissible tensile and compressive forces, in which a certain deformation of these other housing parts may take place, these do not exert any influence on the carrier and its geometry and therefore cannot influence the sensor arrangement on the separate carrier. A maximum protection against faulty measurements is therefore achieved even upon the action of high tensile and compressive forces, in particular also upon the action of forces perpendicular to the measuring direction of the measuring cell.

Preferred sensor arrangements for the load cell according to the invention comprise a transmitter element and a sensor element that is separate from this, a first of these two elements being held stationarily on the carrier and the second of these elements being held movably on the carrier with respect to the first element.

In this case, the second element is preferably held on a spring part of the carrier, with it being possible for the spring part to be configured in one piece with the carrier, on the one hand, or else to be manufactured as a separate part and fixed to the carrier, for example welded. The possibility is therefore provided of carrying out the alignment of the transmitter and sensor element, which is important for the accuracy of the load cell, in a prior and separate process, which is substantially simpler than not implementing this until assembly of the load cell. Moreover, the transmitter and sensor element can be arranged with respect to one another to achieve maximum signals, even if the spacings to be maintained here should optionally be small. Even in this case, a high degree of constant product quality is easy to ensure.

The second element will preferably be arranged in a neutral point of the flectionally elastic element in the unloaded state of the force transducer, so that, on the one hand, a maximum sensitivity of the sensor arrangement or the load cell itself can be achieved and, on the other hand, a non-sensitivity of the measurement of transverse forces possibly occurring during the measurement results.

Preferred sensor arrangements work according to the principal of contact-free path measurement, so the transmitter and sensor element are two parts which are physically completely separate from one another, which can be moved relative to one another in a loss-free manner.

A particularly suitable sensor arrangement, which works according to the principle of contact-free path measurement is a Hall sensor arrangement with a magnet as the transmitter element and a Hall sensor as the sensor element.

Likewise, a preferred sensor arrangement, which functions according to the principle of contact-free path measurement, is an optical sensor arrangement with a light source as the transmitter element and a photo element as the sensor element.

Obviously, a plurality of alternatives are available for the arrangement of the transmitter and sensor element of the sensor arrangement on the separate carrier, it being preferred, however, to mechanically hold one or both of these elements on the carrier.

This means that the respective element is arranged in a part of the carrier, for example by a force fit, or is moved into an end position and this is then mechanically secured. Compared to an adhesive connection, the mechanical holding of the sensor and transmitter elements on the separate carrier has the advantage that no ageing processes are to be feared here, which could lead to a change in the position of the transmitter and sensor element relative to one another.

This is significant, in particular for application of the present load cell in cars, in particular for determining forces exerted on car seats during loading by a person, as these load cells, under certain circumstances, have to remain for many years in the motor vehicle and have to function reliably, to generate reliable data to control the triggering of the airbag.

The flectionally elastic element is particular preferably to be configured as a flectionally elastic membrane, which is held one the flectionally rigid wall part of the housing by its wall region. Metallic materials, in particular, are suitable for producing the flectionally elastic membrane.

The flectionally elastic membrane may be configured in the form of a strip or polygonally or else in a circular manner, which is preferred, in particular with regard to the higher non-sensitivity that can then be achieved against tilting moments, which may occur upon the introduction of force, whether tensile or compressive forces, in the load cell.

Preferred flectionally elastic membranes have a central recess, for example in the form of a through-opening, the membranes with a circular form then being configured as an annular disc.

The embodiment of the flectionally elastic membrane has a plurality of advantages, which will be elucidated in detail below.

The force introduction part and the flectionally elastic element are preferably configured in one piece with one another or else initially produced as two separate parts and then rigidly connected to one another. This may take place, for example by welding or another material connection.

The force introduction part, in a preferred embodiment, is displaceably arranged coaxially in a through-opening of the housing. In particular, in this embodiment, the force introduction part projects partially through the through-opening of the housing, with advantages for the overall construction, so it is directly available for a force introduction from outside.

With regard to the simplicity of the adjustment of the load cell after assembly, the force introduction part in a preferred embodiment will have a foot part acting on the flectionally elastic element and a contact element which can be adjusted relative to the foot part and is arranged in mechanical contact with a component of the sensor arrangement movably held on the carrier.

The use is again recommended of a flectionally elastic membrane as a flectionally elastic element with a central recess, in particular a through-opening, wherein the contact element of the force introduction part can then be arranged centrally with respect to the recess of the flectionally elastic membrane and can produce a contact with the component, which is arranged on the carrier, of the sensor arrangement, in particular in the plane of the flectionally elastic membrane.

The contact element which is adjustable relative to the foot part of the force introduction part allows an adjustment of the zero point of the load cell to also still be carried out in the assembled state of the load cell so that, in the course of assembly of the load cell, lower demands on the precision of the arrangement of the individual components of the load cell are possible without having to tolerate losses in quality of the finished load cell in return.

The foot part of the force introduction part will preferably have larger dimensions than the through-opening of the housing.

This avoids an overloading of the elastic element occurring upon excessive tensile forces and the foot part of the force introduction part then being able to be supported on the housing.

As already mentioned above, one region of the force introduction part will preferably project from the housing through the through-opening, so the force can be directly introduced there.

The mechanical contact of the contact element of the force introduction part with the movably held component of the sensor arrangement should preferably substantially be a point-wise contact.

It is particularly preferred in this context if the contact element has a rounded tip, by means of which the mechanical contact with the movably held component of the sensor arrangement is produced. With transverse components, which can act on the force introduction part upon the action of force, this avoids these transverse components leading to a signal falsification, as the rounded tip remains substantially unchanged with respect to its vertical position relative to the membrane, as does the movable component of the sensor arrangement inside the load cell.

In order to further assist this, it is preferably provided that the rounded tip of the contact element of the force introduction part has a sliding mechanical contact with the movably held component of the sensor arrangement.

In a further preferred embodiment of the load cell according to the invention, the load cell will comprise stop means, which limit the movement of the force introduction part upon the action of force.

Stop means of this type are preferably configured in such a way that they limit the movement of the force introduction part during the action of tensile and compressive forces.

In a further preferred embodiment, the stop means will comprise a first element, which is supported on the outside of the housing. Compressive forces, which act on the load cell are thereby limited with regard to their action on the flectionally elastic element to the permissible force range.

The first element of the stop means will preferably have a receiver for an elastomer element on its side facing the outside of the housing. The elastomer element may fulfill two types of function, on the one hand, the resilient mounting of the first element of the stop means on the outside of the housing, and on the other hand, a sealing function, in particular when the elastomer element extends all the way round the through-opening of the housing.

The stop means preferably have a second element, which is supported on the inside of the housing. For example, that which was described above as the foot part of the force introduction part, which has a radially larger dimension than the through-opening of the housing, through which the force introduction part extends, is suitable here. With regard to the intended application of the load cell in a motor vehicle, in a preferred embodiment, the housing will surround the force transducer and sensor arrangement with the separate carrier substantially on all sides.

The housing of the load cell may be configured differently depending on the purpose of application and area of use. For the applications in the motor vehicle sector, which are of particular interest, it is provided that the housing comprises a cover element, a base element and a flectionally rigid side wall connecting the cover to the base element. For the circular membrane described as preferred above, the housing will obviously preferably have a disc shape or hollow cylindrical shape.

The housing is preferably multi-part, in particular two-part, the housing then being formed from a cover part and a base part. The side wall may then be a component of the cover and/or base part.

It is easiest to form the housing of the load cell by welding the cover part and base part to one another. It is sufficient here if the cover part and base part are arranged on top of one another and thus fixed to one another and then the weld seam can be formed. Even if this type of assembly of the housing may entail certain tolerances, there is adequate possibility, owing to the possibilities described above for adjusting the sensor arrangement within the already completed housing of the load cell for implementing the quality demands of the load cell without reducing them, even in this simple type of assembly of the load cell.

In the housing parts, the cover element will preferably comprise the through-opening of the housing, through which the force introduction part works on the flectionally elastic element of the load cell.

In addition, the housing may comprise a through-opening for electrical supply and/or signal lines, which are used for the current supply of the sensor arrangement or the evaluation electronics which are connected downstream from the sensor arrangement and may optionally also be accommodated in the load cell housing. The signal lines supply the signals generated by the sensor arrangement, which are optionally processed already by the electronics, accommodated in the force measuring cell, to the outside world and make then accessible for control functions.

The base element of the housing will preferably have one or more fastening elements, with which the latter may be anchored, for example, in the motor vehicle. For example, lugs may be present on the base element, which can be screwed to other parts of the motor vehicle.

Alternatively or in addition, a threaded part, with which a screw connection with external parts can be produced, may be configured on the base element.

The threaded part will preferably be configured in one piece with the base element and this saves steps during assembly of the load cell and, moreover, is beneficial to the accuracy of the arrangement of the threaded part relative to the load cell.

One of the possibilities for holding the flectionally elastic element on the flectionally rigid wall part of the housing is to hold this element between two housing parts with a force fit.

As an alternative to this, the elastic element may be connected to the housing by means of a weld point, so the elastic element and the housing part may be handled again as a unit. In particular, it is possible to achieve or else improve the rigidity of the wall part only upon the welding operation. Economies of weight in the housing can be achieved thereby Something similar also applies to the separate carrier, which can be held between two housing parts by a force fit.

It is equally possible to connect the carrier to the housing part with a material connection, in particular by means of an adhesive or weld connection.

The present invention in turn also allows simple manufacturing here without excessively high demands regarding low tolerances during assembly of the flectionally elastic element and the housing or the carrier and the housing and also the arrangement between the carrier and the flectionally elastic element, as the mechanical contact point can preferably be adjustably held between the movable part of the sensor arrangement and the force introduction part.

The through-opening of the housing is preferably configured as a type of guide for the force introduction part, this not being intended to mean that the force introduction part is guided approximately with sliding friction in the through-opening of the housing. Rather, a gap will preferably be present between the force introduction part and the through-opening of the housing and prevents transverse forces bringing about an excessive deflection of the force introduction part from the normal with respect to the flectionally elastic element.

In particular, the through-opening of the housing is dimensioned such that it guides the force introduction part so as to be secured against tilting moments.

The gap preferably provided between the force introduction part and the through-opening has a width of, in particular 0.1 mm to about 0.5 mm.

In one embodiment it is provided that the transmitter element and the sensor element are arranged non-centrally on the carrier. A flat construction of the carrier and therefore of the load cell can thereby be implemented, so the latter can be configured with a low axial height.

To achieve a low axial height, it is advantageous if the first element is arranged below the second element, the second element being movable in a space above the first element.

It is favourable if the carrier has a cut-out, which may be configured as a through hole or as a blind recess, in which the second element is at least partially arranged. The second element can thus be easily fixed to the carrier.

It is favourable if the cut-out is formed on a spring part of the carrier. A movable arrangement between the first element and the second element can thus be easily implemented.

The carrier with the sensor arrangement may be configured with a low axial height if the transmitter element and the sensor element are arranged transversely offset with respect to an axis of a contact element.

It is favourable if the carrier has a contact region, which is convex. A point contact between a contact element and the carrier can thus be implemented. The contact region is preferably formed on a spring part of the carrier, in this case. The corresponding carrier can be produced easily, for example in one piece, as an injection moulding.

It is favourable if the contact region is arranged between spaced-apart spring webs. The contact region can thus be arranged centrally to achieve a simple symmetrical alignment with a contact element. In this case, it can simultaneously be configured on a spring part to implement a movement between the spring part and a stationary part on the introduction of force.

It is particularly advantageous if a spring part has spaced-apart spring webs, which are provided in each case with spaced-apart weakening zones. The spring part can thus be configured in a defined manner with respect to its reaction to force loading.

It is in particular favourable if corresponding weakening zones of different spring webs are located at the same height. A parallelogram structure can thus be implemented in order to obtain an optimised introduction of force.

These and further advantages of the invention will be described in more detail below with the aid of the drawings.

DETAILED DESCRIPTION OF THE INVENTION

Figure 1:
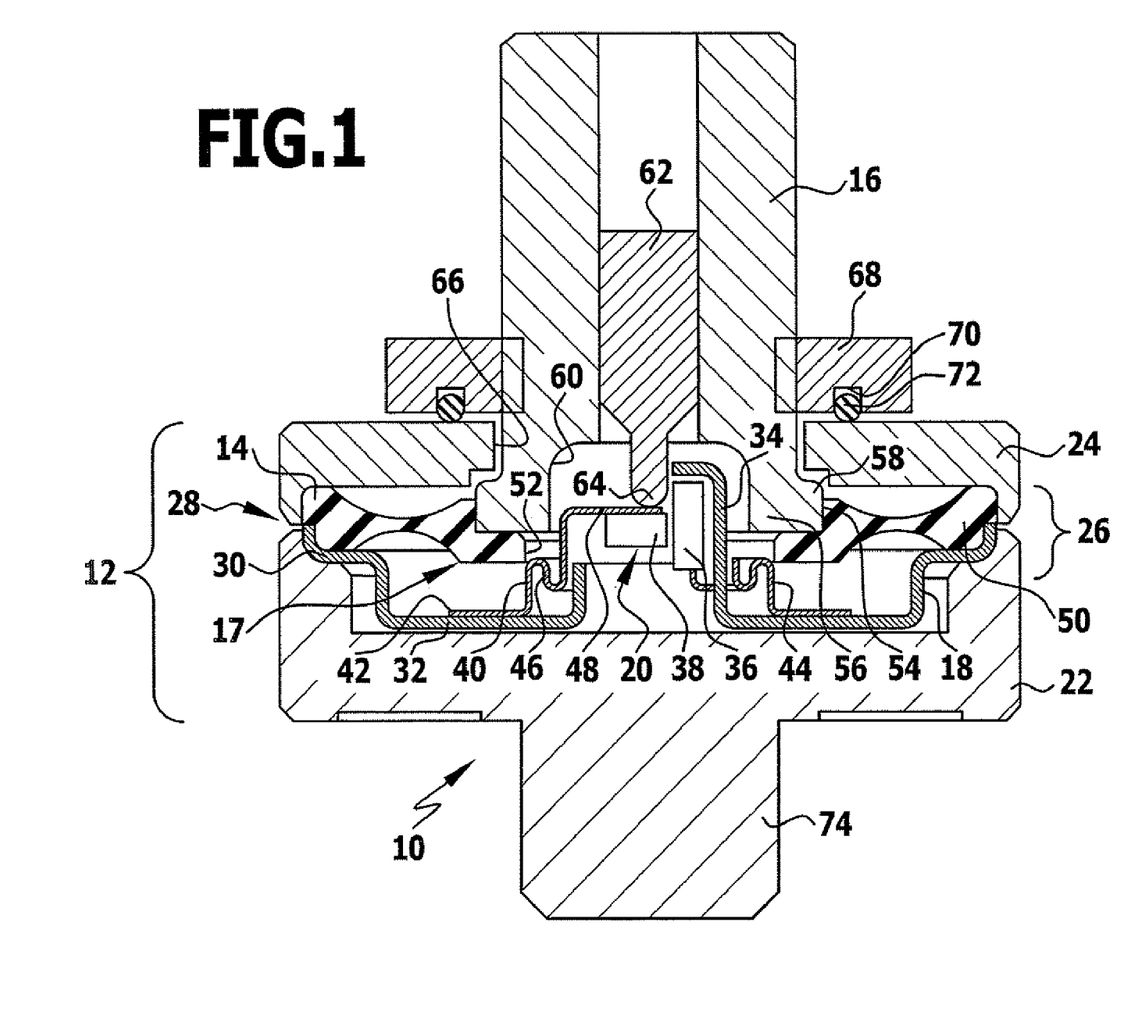
FIG. 1 shows a lateral sectional view of an embodiment of a load cell with a first embodiment of a separate carrier.

FIG. 1 shows a cross-section through an embodiment of a load cell 10 according to the invention. This is constructed from a housing 12, a flectionally elastic element 14 arranged in the housing 12, which, together with a force introduction part 16, forms a force transducer 17 of the load cell 10, as well as the separate carrier 18, on which a sensor arrangement 20 of the load cell 10 is arranged.

The housing 12 is composed of a base part 22 and a cover part 24, which together form a side wall 26 of the housing 12, which is the flectionally rigid wall part of the housing 12.

Provided on the regions, which come into contact with one another, of the base part 22 and cover part 24, bevelled regions are provided on the outer periphery, which together form a wedge-shaped groove 28, which receives the weld seam when the base part 22 and cover part 24 are connected by means of welding.

The carrier 18 is arranged in the interior of the housing 12 in such a way that it is only in contact with the flectionally rigid part of the housing 12, namely the side wall 26, to which it is preferably bonded or welded at an edge region 30. The separate carrier 18 keeps an adequate spacing from all other regions of the housing 12, so, upon possible twisting of the housing 12, no mechanical contact occurs between the separate carrier 18 and the housing 12.

The carrier 18 is preferably formed from a metal sheet or a plastics material part, which is produced by a forming step for example by an injection method, on the one hand, provided with the edge region 30, and, on the other hand, with the downwardly returning region 32, which is broken open in its centre and bent up in order to form the holder for a component of the sensor arrangement 20. This part of the separate carrier 18 comprises a lug 34, which is bent vertically upwardly, on which, shown only schematically, a Hall sensor element 36 of the sensor arrangement 20 is mechanically held. The transmitter element associated with the Hall sensor element 36, a magnet 38, is aligned relative to the Hall sensor element 36 in the position with maximum sensitivity of the Hall sensor element 36.

While the Hall sensor element 36 is held stationarily inside the housing by the lug 34 (with respect to the flectionally rigid side wall 26), the transmitter part, i.e. the magnet 38, is movably arranged and in fact held by a spring part 40, which is supported on the separate carrier 18 in the region of the return 32.

The spring part 40 is preferably formed as an annular plastics material part or spring steel sheet and is supported annularly by a foot part 42 on the carrier part 18. If the spring part 40 and carrier part 18 are manufactured from plastics material, the spring part 40 and the carrier part 18 are preferably produced in one piece. Toward the centre, the spring part 40 is bent upwardly to form a shoulder 44, and continues in the direction toward the centre with a type of bellows 46, adjoined in turn by a parallel holding face 48 parallel to the main membrane plane. The holding face 48, on its underneath, holds the magnet 38, it being possible for the position thereof to vary relative to the stationarily held Hall sensor 36 depending on the loading of the force introduction part 16. The movement which the magnet 38 on the holding face part 48 carries out is mechanically decoupled by the bellows element 46 from the return 32 of the separate carrier, so a change of location of the magnet 38 does not continue in a deformation of the carrier 18.

A further part of the spring element 40 may be shaped in such a way that it mechanically secures the Hall sensor 36 in its position on the lug 34.

The mechanical decoupling of the change in location of the magnet 38 on loading the load cell 10 relative to the carrier 18, in particular of the position of the Hall sensor 36 on the lug 34 also comes about in that the material thickness and the strength of the carrier 18 is selected so as to be correspondingly larger.

A substantial aspect of the present invention is realised in the configuration of the carrier 18 and the sensor arrangement 20 arranged thereon. Before assembly of the load cell in an assembly process to be carried out separately, the carrier 18 can actually already be prepared and the sensor arrangement 20 preassembled on it, so the carrier 18 together with the sensor arrangement 20 already has a defined allocation of the sensor element and transmitter element before the carrier 18 together with the sensor arrangement 20 is installed in the housing 12 of the load cell 10. The spring element 40 of the carrier 18 is also important for the movable holding of one of the components of the sensor arrangement 20.

This advantage is not only produced when using a Hall sensor arrangement, but equally in other contact-free path measuring systems, for example an optical sensor arrangement. An optimal adjustment of the transmitter element and sensor element may also take place here, in each case, separately and independently of the assembly steps of the load cell, which, on the one hand allows better monitoring in the assembly of the individual parts and, on the other hand, also better adjustment if necessary.

The membrane 14, in the present embodiment, is configured as a circular membrane, but may also be configured in the form of a strip or polygonally if it is ensured that the strip or polygonal shape is adequately stable for the acting forces and in particular if no tilting moments acting transversely to the main direction of the forces to be measured are to be expected during the introduction of force.

The membrane 14 is configured annularly in the present embodiment with a thickened edge 50, with which the membrane 14 is held on the flectionally rigid side wall 26. The edge 50 of the membrane 14 can be welded or bonded together with the carrier 18, for example to the base part 22, before the cover part 24 is placed on and the housing 12 is welded as a whole in the region of the groove 8. An increase in the rigidity is achieved by welding the edge part 50 to the side wall 26.

The edge 50 of the membrane 14 takes into account here the common assembly of the carrier 18 and membrane 14, in that a returning edge region is provided there, into which the edge part 30 of the carrier 18 moves, so the edge part is additionally radially held in its position and to a certain degree braced. The carrier 18 thereby receives a defined shape and the position, in particular of the return 32 of the carrier 18 is further improved by the prestressing, which is made possible for the carrier 18 by the movement of the edge region 30 into the corresponding return on the part of the edge 50 of the membrane 14. It may be provided during assembly that, firstly, the membrane 14 with the already completely assembled carrier 18 with the sensor arrangement 20 are connected to one another, in particular are already welded to one another before this unit of the membrane 14, carrier 18 and sensor arrangement 20 is inserted in the base part 22 of the housing 12 and then welded thereto.

Alternatively, during assembly, the already completely assembled carrier 18 with the sensor arrangement 20 with the base part 22 of the housing 12 can firstly be bonded on the edge part 30. The membrane 14 is then placed on the assembled carrier part 18 and held between the two housing parts, base part 22 and cover part 24, with a force fit.

A through-opening 52, into which the sensor arrangement projects during assembly, is provided in the central part of the membrane 14, so the most sensitive point of the Hall sensor 30 and the magnet 38 directed thereto are substantially located in the central plane of the membrane 14.

The region right round the through-opening 52 of the membrane 14 is so reinforced and has an annular return 54, which receives a foot part 56 of the force introduction part 16. The membrane 14 and the force introduction part 16 can be manufactured in one piece or welded to one another in the region of the return 54.

This foot part 56 of the force transducer 17 is provided with a radially outwardly projecting edge region 58, which will be dealt with further below in conjunction with the description of the overload protection present in the load cell 10.

The foot part 56 of the force introduction part 16 moreover centrally has a recess 60, which creates space for a sensor arrangement 20 positioned inside the through-opening 52 of the membrane 14.

The force introduction part 16 is substantially hollow cylindrical and in the interior holds a contact element 62 which extends into the recess 60 and is relatively displaceable with respect to its position relative to the recess 60 and therefore in the direction of the central plane of the membrane 14 and can be adjusted. After adjustment, the contact element 62 is fixed in its position relative to the force introduction part 16. The contact element 62 may be configured as a threaded pin.

The contact element 62, at its free end projecting into the recess 60, has a contact tip 64, which is in mechanical contact with the holding face 48 of the spring part 40 and thus determines the relative position of the transmitter element in the form of the magnet 38 of the sensor arrangement 20 relative to the sensor element in the form of the Hall sensor element 36.

The contact tip 64 has a rounded area, which, during a tilting movement of the force introduction part 16, slides over the holding face 48 and therefore does not bring about any change in the relative position of the magnet 38 relative to the Hall sensor element. The load cell and therefore the measurement signal are therefore insensitive to transverse forces and tilting movements connected therewith.

After complete assembly of the load cell, i.e. after insertion of the carrier element 18 with the sensor arrangement 20 and the membrane 14 and the subsequent sealing by means of welding of the two housing parts 22 and 24, an adjustment can then still be carried out by means of the position of the contact element 62 or its contact tip 64 with respect to the centre plane of the membrane 14, so the whole of the force transducer (force introduction part 16 and membrane 14) and the associated ensemble of the sensor arrangement 20 have an optimum configuration. The contact element 62 is thus fixed with regard to its position inside the force introduction part 16.

The force introduction part 16 projects, with its end opposing the foot part 42, from the interior of the load cell 10 through a through-opening 66 in the cover part 24 of the housing 12 and is therefore directly available for the introduction of force.

The force introduction part 16, on its outer face, preferably has a threaded portion, which is not shown in more detail in the schematic drawing of the figure present here.

A nut 68 can be screwed onto this external threaded portion of the force introduction part 16 and, on its side facing the housing surface, has an annular groove 70, in which an elastomer ring 72 is received The groove 70 and the elastomer ring 72 are dimensioned such that the elastomer ring 72 projects slightly over the surface of the nut 68, so the latter does not come to rest directly on the housing surface of the cover part 24, but via the elastomer ring 72.

The nut 68 is screwed onto the external threaded portion of the force introduction part 16 to such an extent that the nut still maintains a spacing from the surface of the housing part 24, which corresponds to the maximum permissible movement of the force introduction part 16 into the interior of the housing 12. A maximum limitation is therefore provided for the force introduction by means of the force introduction part 16 during compressive forces and the stop thus formed by the nut 68 protects the membrane 14 from excessive loading.

During the action of tensile forces, the radially projecting edge 58 of the foot part 56 also works as a stop as the latter can only be moved to the outside at a maximum until the radially projecting edge 58 comes to rest on the cover part 24 and the return face specially configured here.

The load cell 10 is therefore protected from overloading during the action of tensile and compressive forces, Furthermore, the load cell is protected against excessive tilting movements, i.e. force components which act perpendicularly to the centre axis of the force introduction part 16, in that the radially projecting foot part engages in a corresponding annular return of the cover upper part 24 and is held there and, on the other hand, by the nut 68 arranged on the housing surface, which is also supported on the outside of the housing from a certain tilting movement of the force introduction part 16 and counteracts further tilting of the force introduction part 16.

Because of these measures, the load cell according to the invention is not only easy to manufacture but also withstands excessive loads in a harsh environment. Because of the encapsulation of the force transducer consisting of the membrane 14 and the foot part of the force introduction part 16 inside the housing 12, which only has a through-opening 66 for the force introduction part 16, and a through-opening (not shown here) in order to produce an electrical connection to the Hall sensor 36 in the interior of the housing 12, a substantially tight encapsulation takes place making the load cell reliable to use for many years. Owing to the elastomer ring 72, which is supported, on the one hand, against the nut 68 and, on the other hand, against the outer surface of the cover part 24, a sealing of the interior of the load cell 10 or of its housing 12 also takes place in the region of the opening 66, in which the force introduction part 16 is displaceably held. A gap can thus be allowed between the through-opening 56 and the force introduction part 16, in the form that in the event of loads, whether tensile or pressure loads, and also in the event of tilting moments which are not excessive, a contact free movement of the force introduction part 16 is made possible inside the through-opening 66. Nevertheless, the load cell 10 thus formed is reliable to operate in a rough, i.e. even climatically rough environment such as the car.

The through-opening, not shown, for passing electrical supply and signal lines through to the Hall sensor 36 can be sealed as conventional with sealing materials, as no relative movement of the lines relative to the housing or the housing wall has to be allowed here.

The force introduction part 16 projecting out of the housing 12 and provided with an external thread portion, on the one hand, facilitates assembly of the load cell at its site of use. A screw bolt 74 is provided centrally on the base part 22 and can also be replaced or supplemented by other fastening elements, such as, for example, radially projecting lugs.

In a further embodiment, a separate carrier 102 (FIG. 2) is configured in one piece and produced, in particular, from a plastics material. The sensor arrangement 20 of the corresponding load cell is arranged on the carrier 102. The arrangement is, in particular, as described above, in other words the carrier 102 is arranged in the interior of a housing in such a way that it is only in contact with a flectionally rigid part of the housing, namely a side wall 26 and/or a corresponding region (in particular the outer edge region) of the base part 22.

The carrier 102 comprises a stationary part 104, which is approximately annular with an inner through-opening 106. A spring part 108 is arranged on the stationary part 104 and is movable on the introduction of force by means of a contact element 110 in a direction, which is parallel or approximately parallel to an axis 112 of the contact element 110. The contact element 110 is shown spaced apart from the carrier 102 in FIG. 2 for illustrative reasons.

Figure 2:
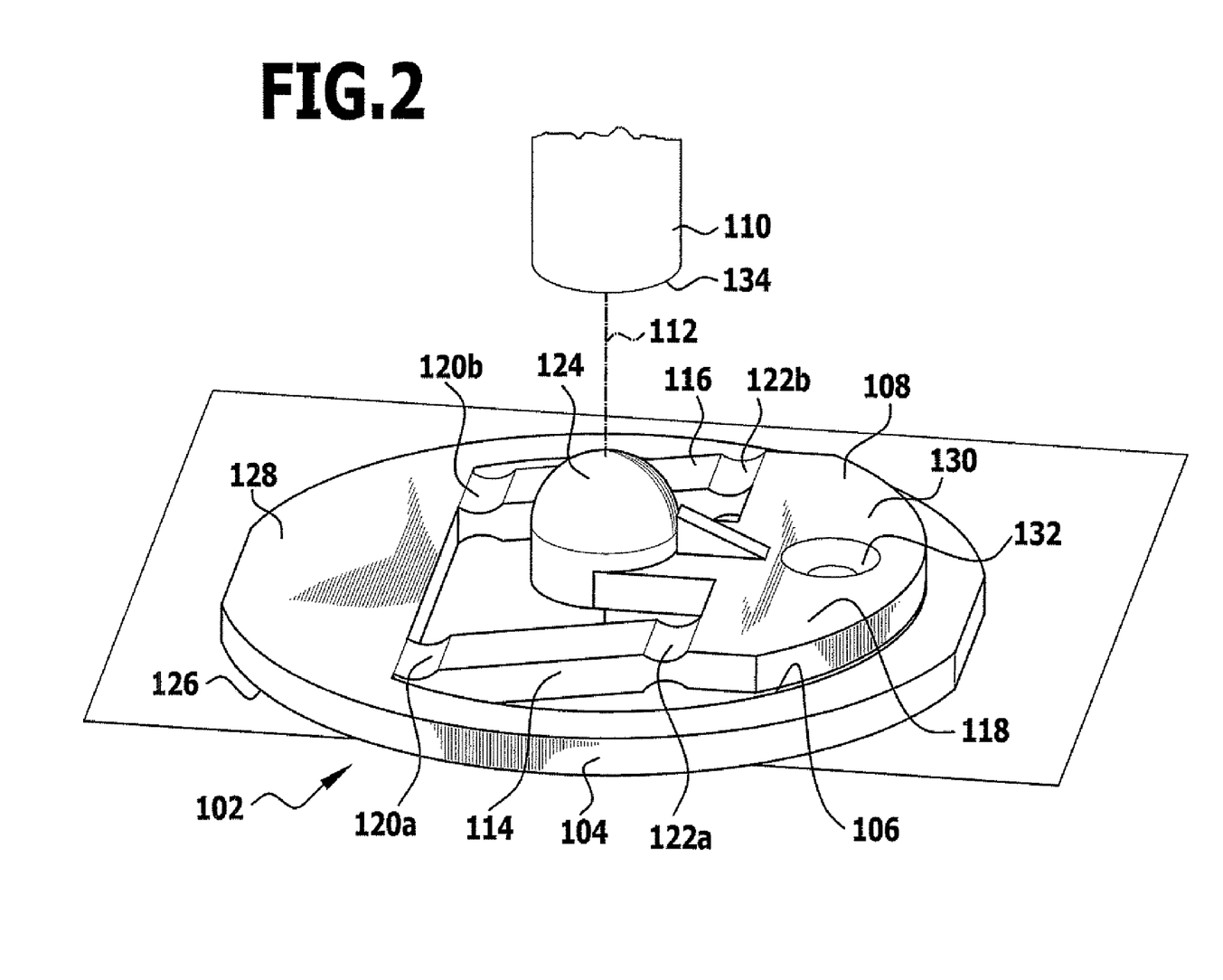
FIG. 2 shows a perspective view of a second embodiment of a separate carrier.

The stationary part 14 rests on the housing 12; the spring part 108 is not influenced by the housing.

The spring part 108 comprises a first spring web 114 and a second spring web 116. These two spring webs 114 and 116 are connected by a connecting region 118. Both the first spring web 114 and the second spring web 118, at their connection to the stationary part 104, have weakening zones 120a, 120b, for example in the form of constrictions. Furthermore, they have weakening zones 122a, 122b on their connection to the connecting region 118. The weakening zones 120a and 120b rest at the same level relative to the stationary part 104. The weakening zones 122a and 122b are furthermore located at the same level relative to the stationary part 104. The connecting line between the weakening zones 122a and 122b is parallel to the connecting line between the weakening zones 120a and 120b. A parallelogram structure is thus provided for the spring part 108.

Formed centrally between the first spring web 114 and the second spring web 116 is a contact region 124, on which the contact element 112 acts. The contact region 124 is convex; for example, it is hemi-spherical. The contact region 124 projects through the through-opening 52 of the flectionally elastic element 14. The other regions of the carrier 102 (including the spring webs 114, 116) are located below the flectionally elastic element 14.

The contact region 124 is aligned with the axis 112 of the contact element 110. In particular, a sphere axis of the contact region 124 and the axis 112 are at least approximately coaxial with one another.

The contact region 124 is also connected to the connecting region 118.

In the embodiment shown, the stationary part 104 is flat with a first face 126 and a second face 128, between which the stationary part 104 extends. In particular, the first face 126 and the second face 128 are parallel to one another.

In the non-force loaded state of the contact region 124, the spring part 108 protrudes from the stationary part 104, so a (flat) surface 130 is spaced apart from the second face 128 of the stationary part 104. In the region of the surface 130, the spring part 108 has, in particular, the same thickness as the stationary part 104.

In the force-loaded state, the spring part 108 can project into the through-opening 106. The contact region 124 projects, in this case, beyond the surface 130.

The connecting region 118 has a recess 132, in which an element of the sensor arrangement 20, such as, for example, the magnet 38 is positioned. The magnet 38 is therefore movable by means of the spring part 108 relative to the stationary part 104.

The corresponding element of the sensor arrangement 20, in the example mentioned then the sensor, such as, for example, a Hall sensor, is arranged below the recess 132 (not shown in FIG. 2). Thus, the magnet 32 can then be moved in a space above the sensor 36 by means of the movement of the spring part 108. In particular, the magnet 38 and the sensor 36 are then at least approximately aligned with an alignment direction, which is at least approximately parallel to the axis 112. Because of the introduction of force, the spacing between the magnet 38 and sensor 36 reduces in the alignment direction without a substantial transverse offset. The spacing parallel to the alignment direction between the magnet 38 and sensor 36 is thus precisely detected.

The recess 132 is transversely offset with respect to the contact region 124. Accordingly the sensor arrangement with its transmitter element and its sensor element is then arranged offset with respect to the contact region 124, in fact, in a transverse direction in relation to the axis 112.

The contact region 124 is therefore arranged centrally and the sensor arrangement is arranged eccentrically. The carrier 102 with the sensor arrangement can therefore be very flat, so a load cell with a low height can be provided.

The contact element 110 is thus preferably flat at its end 134, which contacts the contact region 124.

A load cell, which comprises the carrier 102, otherwise functions as described above.

The invention claimed is:

1. A load cell, comprising:
   a force transducer for recording tensile and compressive forces to be determined;
   wherein the force transducer comprises a flectionally elastic element and a force introduction part acting on the flectionally elastic element;
   a sensor arrangement for detecting a deformation of the flectionally elastic element and the transformation thereof into an electric weighing signal; and
   a housing receiving the force transducer and the sensor arrangement with a flectionally rigid wall part, on which the flectionally elastic element of the force transducer is held;
   wherein the sensor arrangement is arranged on a separate carrier, which is held on at least one of the flectionally rigid wall part and a flectionally rigid base part region of the housing;
   wherein the sensor arrangement comprises a transmitter element and a sensor element, a first of these two elements being held stationary on the carrier and the second of these elements being held movably on the carrier with respect to the first element; and
   wherein the second element is held on a spring part of the carrier.

2. The load cell according to claim 1, wherein the carrier is held and supported exclusively on the flectionally rigid wall part of the housing.

3. The load cell according to claim 1, wherein the second element is arranged in a neutral point of the flectionally elastic element in the unloaded state of the force transducer.

4. The load cell according to claim 1, wherein the sensor arrangement is a sensor arrangement for contact-free path measurement.

5. The load cell according to claim 4, wherein the sensor arrangement is a Hall sensor arrangement.

6. The load cell according to claim 4, wherein the sensor arrangement is an optical sensor arrangement.

7. The load cell according to claim 1, wherein at least one of the transmitter element and the sensor element is mechanically held on the carrier.

8. The load cell according to claim 1, wherein the flectionally elastic element comprises a flectionally elastic membrane, which is held on the flectionally rigid wall part of the housing by its edge region.

9. The load cell according to claim 8, wherein the flectionally elastic membrane is a metal membrane.

10. The load cell according to claim 9, wherein the housing has a through-opening that is configured as a guide for the force introduction part.

11. The load cell according to claim 10, wherein the through-opening of the housing guides the force introduction part so as to be secured against tilting moments.

12. The load cell according to claim 8, wherein the flectionally elastic membrane comprises a central recess.

13. The load cell according to claim 12, wherein the membrane is configured as an annular disc.

14. The load cell according to claim 1, wherein the force introduction part and the flectionally elastic element are configured in one piece.

15. The load cell according to claim 1, wherein the force introduction part is displaceably arranged coaxially in a through-opening of the housing.

16. The load cell according to claim 15, wherein the force introduction part projects out of the housing through the through-opening.

17. The load cell according to claim 1, wherein the load cell has stop means, which limit the movement of the force introduction part upon the action of force.

18. The load cell according to claim 17, wherein the stop means limit the movement of the force introduction part upon the action of tensile forces and also compressive forces.

19. The load cell according to claim 18, wherein the stop means comprise a first element, which is supported on the outside of the housing.

20. The load cell according to claim 19, wherein the first element is arranged on a region of the force introduction part arranged outside the housing.

21. The load cell according to claim 19, wherein the stop means comprise a second element, which is supported on the inside of the housing.

22. The load cell according to claim 21, wherein the second element is configured as a foot part of the force introduction part.

23. The load cell according to claim 1, wherein the housing substantially surrounds the force transducer and the sensor arrangement on all sides.

24. The load cell according to claim 1, wherein the housing comprises a cover element, a base element and a flectionally rigid side wall connecting the cover element to the base element.

25. The load cell according to claim 24, wherein the housing is multi-part.

26. The load cell according to claim 25, wherein the housing is formed from a cover part and a base part.

27. The load cell according to claim 26, wherein the flectionally elastic element is held between two housing parts with a force fit.

28. The load cell according to claim 25, wherein the parts of the housing are welded to one another.

29. The load cell according to claim 24, wherein the housing has a through-opening and the cover element surrounds the through-opening of the housing to receive and guide through the force introduction part.

30. The load cell according to claim 24, wherein the base element has one or more fastening elements.

31. The load cell according to claim 30, wherein a threaded part is configured on the base element.

32. The load cell according to claim 31, wherein the threaded part is configured in one piece with the base element.

33. The load cell according to claim 1, wherein the housing comprises a through-opening for at least one of electrical supply lines and signal lines.

34. The load cell according to claim 1, wherein the flectionally elastic element is connected to the housing by means of a weld point.

35. The load cell according to claim 1, wherein the carrier is connected to the housing with a material connection.

36. The load cell according to claim 1, wherein the carrier is held between two housing parts with a force fit.

37. A load cell, comprising:
a force transducer for recording tensile and compressive forces to be determined;
wherein the force transducer comprises a flectionally elastic element and a force introduction part acting on the flectionally elastic element;
a sensor arrangement for detecting a deformation of the flectionally elastic element and the transformation thereof into an electric weighing signal; and
a housing receiving the force transducer and the sensor arrangement with a flectionally rigid wall part, on which the flectionally elastic element of the force transducer is held;
wherein the sensor arrangement is arranged on a separate carrier, which is held on at least one of the flectionally rigid wall part and a flectionally rigid base part region of the housing; and
wherein the force introduction part has a foot part acting on the flectionally elastic element and a contact element which can be adjusted relative to the foot part and is arranged in mechanical contact with a component of the sensor arrangement held movably on the carrier.

38. The load cell according to claim 37, wherein the mechanical contact of the contact element with the movable component is a substantially point-wise contact.

39. The load cell according to claim 37, wherein the contact element has a rounded tip, by means of which the mechanical contact with the movable component of the sensor arrangement can be produced.

40. The load cell according to claim 39, wherein the rounded tip of the contact element is in sliding mechanical contact with the movably held component of the sensor arrangement.

41. The load cell according to claim 37, wherein the housing has a through-opening and the foot part of the force introduction part has a larger radial dimension than the through-opening of the housing.

42. A load cell, comprising:
a force transducer for recording tensile and compressive forces to be determined;
wherein the force transducer comprises a flectionally elastic element and a force introduction part acting on the flectionally elastic element;
wherein the load cell has stop means, which limit the movement of the force introduction part upon the action of tensile forces and also compressive forces;
a sensor arrangement for detecting a deformation of the flectionally elastic element and the transformation thereof into an electric weighing signal; and
a housing receiving the force transducer and the sensor arrangement with a flectionally rigid wall part, on which the flectionally elastic element of the force transducer is held;
wherein the sensor arrangement is arranged on a separate carrier, which is held on at least one of the flectionally rigid wall part and a flectionally rigid base part region of the housing; and
wherein the stop means comprise a first element, which is supported on the outside of the housing and the first element of the stop means has a receiver for an elastomer element on its side facing the outside of the housing.

43. A load cell, comprising:
a force transducer for recording tensile and compressive forces to be determined;
wherein the force transducer comprises a flectionally elastic element and a force introduction part acting on the flectionally elastic element;
a sensor arrangement for detecting a deformation of the flectionally elastic element and the transformation thereof into an electric weighing signal; and
a housing receiving the force transducer and the sensor arrangement with a flectionally rigid wall part, on which the flectionally elastic element of the force transducer is held;

wherein the sensor arrangement is arranged on a separate carrier, which is held on at least one of the flectionally rigid wall part and a flectionally rigid base part region of the housing;

wherein the flectionally elastic element comprises a flectionally elastic metal membrane, which is held on the flectionally rigid wall part of the housing by its edge region; and wherein the housing has a through-opening, and a gap, the gap having a width of about 0.1 mm to about 0.5 mm, present between the force introduction part and the through-opening.

44. A load cell, comprising:

a force transducer for recording tensile and compressive forces to be determined;

wherein the force transducer comprises a flectionally elastic element and a force introduction part acting on the flectionally elastic element;

a sensor arrangement for detecting a deformation of the flectionally elastic element and the transformation thereof into an electric weighing signal; and a housing receiving the force transducer and the sensor arrangement with a flectionally rigid wall part, on which the flectionally elastic element of the force transducer is held;

wherein the sensor arrangement is arranged on a separate carrier, which is held on at least one of the flectionally rigid wall part and a flectionally rigid base part region of the housing;

wherein the sensor arrangement comprises a transmitter element and a sensor element, a first of these two elements being held stationary on the carrier and the second of these elements being held movably on the carrier with respect to the first element; and wherein the transmitter element and the sensor element are arranged non-centrally on the carrier.

45. The load cell according to claim 44, wherein the transmitter element is arranged below the sensor element, the sensor element being movable in a space above the transmitter element.

46. The load cell according to claim 44, wherein the carrier has a recess, in which the sensor element is arranged.

47. The load cell according to claim 46, wherein the recess is formed on a spring part of the carrier.

48. The load cell according to claim 44, wherein the transmitter element and the sensor element are arranged transversely offset with respect to an axis of a contact element.

49. A load cell, comprising:

a force transducer for recording tensile and compressive forces to be determined;

wherein the force transducer comprises a flectionally elastic element and a force introduction part acting on the flectionally elastic element;

a sensor arrangement for detecting a deformation of the flectionally elastic element and the transformation thereof into an electric weighing signal; and a housing receiving the force transducer and the sensor arrangement with a flectionally rigid wall part, on which the flectionally elastic element of the force transducer is held;

wherein the sensor arrangement is arranged on a separate carrier, which is held on at least one of the flectionally rigid wall part and a flectionally rigid base part region of the housing; and wherein the carrier has a contact region, which is convex.

50. The load cell according to claim 49, wherein the contact region is arranged between spaced-apart spring webs.

51. A load cell, comprising:

a force transducer for recording tensile and compressive forces to be determined;

wherein the force transducer comprises a flectionally elastic element and a force introduction part acting on the flectionally elastic element;

a sensor arrangement for detecting a deformation of the flectionally elastic element and the transformation thereof into an electric weighing signal; and a housing receiving the force transducer and the sensor arrangement with a flectionally rigid wall part, on which the flectionally elastic element of the force transducer is held;

wherein the sensor arrangement is arranged on a separate carrier, which is held on at least one of the flectionally rigid wall part and a flectionally rigid base part region of the housing, and a spring part supported on the carrier, wherein the spring part has spaced-apart spring webs, which webs include spaced-apart weakening zones.

52. The load cell according to claim 51, wherein corresponding weakening zones of different spring webs are located at the same height.

* * * * *